United States Patent
Park et al.

(10) Patent No.: US 8,340,165 B2
(45) Date of Patent: Dec. 25, 2012

(54) METHOD AND SYSTEM FOR ANALYZING ERROR PROBABILITY OF COMMUNICATION SYSTEM USING GAUSSIAN Q FUNCTION

(75) Inventors: Jin A Park, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 12/938,726

(22) Filed: Nov. 3, 2010

(65) Prior Publication Data
US 2011/0154126 A1    Jun. 23, 2011

(30) Foreign Application Priority Data

Dec. 17, 2009 (KR) .......... 10-2009-0125956
Mar. 31, 2010 (KR) .......... 10-2010-0029073

(51) Int. Cl.
*H04Q 1/20*   (2006.01)
(52) U.S. Cl. ......... 375/224; 714/704; 714/746; 714/799
(58) Field of Classification Search .......... 375/224, 375/340; 714/704, 746, 799
See application file for complete search history.

(56) References Cited

U.S. PATENT DOCUMENTS
6,304,593 B1 * 10/2001 Alouini et al. ............... 375/216
2006/0126992 A1 6/2006 Hashimoto et al.

FOREIGN PATENT DOCUMENTS
JP 2005-203400 A 7/2005
JP 2007-164617 A 6/2007

OTHER PUBLICATIONS

Seungkeun Park et al., "An alternative expression for the symbol-error probability of MPSK in the presence of I/Q unbalance", IEEE Transactions on Communications, vol. 52, No. 12, Dec. 2004, pp. 2079-2081.
Seungkeun Park et al., "Probability of an arbitary wedge-shaped region of the MPSK system in the presence of quadrature error", IEEE Communications Letters, vol. 9, No. 3, Mar. 2005, pp. 196-197.
Seungkeun Park et al., "SEP performance of coherent MPSK over fading channels in the presence of phase/quadrature error and I-Q gain mismatch", IEEE Transactions on Communications, vol. 53, No. 7, Jul. 2005, pp. 1088-1091.
Seungkeun Park et al., "Computing the average symbol error probability of the MPSK system having quadrature error", ETRI Journal, vol. 28, No. 6, Dec. 2006, pp. 793-795.

(Continued)

*Primary Examiner* — Curtis Odom
(74) *Attorney, Agent, or Firm* — Rabin & Berdo, P.C.

(57) ABSTRACT

Provided is a method and system for calculating a bivariate Gaussian Q function using a univariate Gaussian Q function to thereby analyze an error probability of a communication system. A method of calculating an error probability of a communication system may include: receiving encoded communication information from another communication system; restoring information desired to be transmitted by another user by decoding the encoded communication system; and calculating the error probability by analyzing the restored information using a bivariate Gaussian Q function, the error probability indicating a probability that the restored information is different from the information desired to be transmitted by the other user. The calculating may include calculating the bivariate Gaussian Q function using a univariate Gaussian Q function.

19 Claims, 3 Drawing Sheets

OTHER PUBLICATIONS

Leszek Szczecinski et al., "Exact evaluation of bit- and symbol-error rates for arbitary 2-D modulation and nonuniform signaling in AWGN channel" IEEE Transactions on Communications, vol. 54, No. 6, Jun. 2006, pp. 1049-1056.

Mohamed-Slim Alouini et al., "Dual diversity over correlated lognormal fading channels", IEEE Transactions on Communications, vol. 50, No. 12, Dec. 2002, pp. 1946-1959.

Marvin K. Simon, "A simpler form of the Craig representation for the two-dimensional joint Gaussian Q-function", IEEE Communications Letters, vol. 6, No. 2, Feb. 2002, pp. 49-51.

* cited by examiner

METHOD AND SYSTEM FOR ANALYZING ERROR PROBABILITY OF COMMUNICATION SYSTEM USING GAUSSIAN Q FUNCTION

CROSS-REFERENCE TO RELATED APPLICATIONS

This application claims the benefit of Korean Patent Application No. 10-2009-0125956, filed on Dec. 17, 2009, and Korean Patent Application No. 10-2010-0029073, filed on Mar. 31, 2010, in the Korean Intellectual Property Office, the disclosures of which are incorporated herein by reference.

BACKGROUND

1. Field of the Invention

The present invention relates to a method and system for analyzing an error probability of a communication system by calculating a bivariate Gaussian Q function using a univariate Gaussian Q function.

2. Description of the Related Art

With developments of communication networks, there also increases a loss occurring when a communication system malfunctions due to an error.

Accordingly, to replace in advance a communication system having a relatively high error probability, an error probability of the communication system may be analyzed.

A bivariate Gaussian Q function may be used as a function to analyze the error probability of the communication system.

A conventional bivariate Gaussian Q function may be used to analyze the error probability of the communication system by employing a double integral structure as given by the following Equation 1:

$$Q(x, y; \rho) = \frac{1}{2\pi\sqrt{1-\rho^2}} \int_x^\infty \int_y^\infty \exp\left[-\frac{u^2 + v^2 - 2\rho u v}{2(1-\rho^2)}\right] du\, dv \quad \text{[Equation 1]}$$

However, an equation using the double integral structure may use a relatively large amount of calculations and thus, may require at least a performance for the above calculation. Accordingly, a system for analyzing the error probability of the communication system has been installed in an apparatus having a size greater than or equal to a predetermined level.

Accordingly, there is a desire for a method and system that enables even a mobile calculator of providing only simple calculations to calculate a bivariate Gaussian Q function without using a double integral.

SUMMARY

An aspect of the present invention provides a method and system that enables a low efficient calculator to analyze an error probability of a communication system by calculating a bivariate Gaussian Q function using a univariate Gaussian Q function that is a built-in function.

According to an aspect of the present invention, there is provided a method of calculating an error probability of a communication system, including: receiving encoded communication information from another communication system; restoring information desired to be transmitted by another user by decoding the encoded communication system; and calculating the error probability by analyzing the restored information using a bivariate Gaussian Q function, the error probability indicating a probability that the restored information is different from the information desired to be transmitted by the other user. The calculating may include calculating the bivariate Gaussian Q function using a univariate Gaussian Q function.

According to another aspect of the present invention, there is provided a method of calculating a bivariate Gaussian Q function, the method including: receiving values of x, y, and $\rho$ that are variables of the bivariate Gaussian Q function; calculating values of $\rho_{xy}$, $\rho_{yx}$, and $\rho$ that are variables of a bivariate Gaussian Q function; calculating the values of $\rho_{xy}$, $\rho_{yx}$, and $\delta_{xy}$ based on the values of x, y, and $\rho$; calculating a bivariate Gaussian function $Q(x, 0; \rho_{xy})$ using a univariate Gaussian Q function based on the values of x and $\rho_{xy}$; calculating a bivariate Gaussian function $Q(y, 0; \rho_{yx})$ using the univariate Gaussian Q function based on the values of y and $\rho_{yx}$; and calculating the bivariate Gaussian Q function using $Q(x, 0; \rho_{xy})$, $Q(y, 0; \rho_{yx})$, and $\delta_{xy}$.

According to still another aspect of the present invention, there is provided a system for calculating an error probability of a communication system, including: a receiver to receive encoded communication information from another communication system; a decoder to restore information desired to be transmitted by another user by decoding the encoded communication system; and a bivariate Gaussian Q function analyzer to calculate the error probability by analyzing the restored information using a bivariate Gaussian Q function, the error probability indicating a probability that the restored information is different from the information desired to be transmitted by the other user. The bivariate Gaussian Q function analyzer may calculate the bivariate Gaussian Q function using a univariate Gaussian Q function.

According to yet another aspect of the present invention, there is provided a system for calculating a bivariate Gaussian Q function, the system including: a variable calculator to receive values of x, y, and $\rho$ that are variables of the bivariate Gaussian Q function, and to calculate values of $\rho_{xy}$, $\rho_{yx}$, and $\delta_{xy}$ that are variables of a bivariate Gaussian Q function, based on the values of x, y, and $\rho$; a $Q(x, 0; \rho_{xy})$ calculator to calculate a bivariate Gaussian function $Q(x, 0; \rho_{xy})$ using a univariate Gaussian Q function based on the values of x and $\rho_{xy}$; a $Q(y, 0; \rho_{yx})$ calculator to calculate a bivariate Gaussian function $Q(y, 0; \rho_{yx})$ using the univariate Gaussian Q function based on the values of y and $\rho_{yx}$; and a bivariate Gaussian Q function calculator to calculate the bivariate Gaussian Q function using $Q(x, 0; \rho_{xy})$, $Q(y, 0; \rho_{yx})$, and $\delta_{xy}$.

EFFECT

According to embodiments of the present invention, a bivariate Gaussian Q function may be calculated using a univariate Gaussian Q function that is a built-in function. Specifically, since the bivariate Gaussian Q function can be calculated without using a numerical integral, it is possible to calculate an error probability of a communication system using a low efficient calculator of providing only simple calculations.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
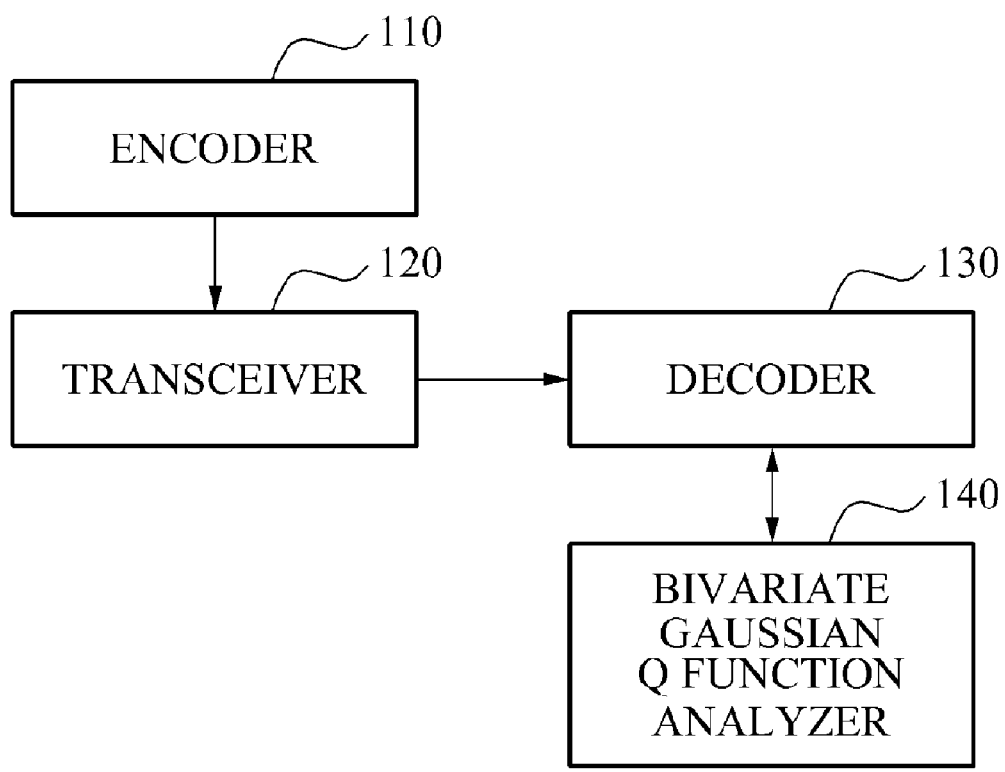
FIG. 1 is a block diagram illustrating a communication system using a Gaussian Q function according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A bivariate Gaussian Q function that is in a double integral structure of above Equation 1 may be calculated using each of two different bivariate Gaussian Q functions as shown in the following Equation 2:

$$Q(x,y;\rho) = Q(x,0,\rho_{xy}) + Q(y,0,\rho_{yx}) - \delta_{xy} \quad \text{[Equation 2]}$$

Here, values of $\rho_{xy}$, $\rho_{yx}$, and $\delta_{xy}$ that are variables of a bivariate Gaussian Q functions of Equation 2 may be calculated by applying x, y, and $\rho$, which are variables of the bivariate Gaussian Q function, to the following Equation 3, Equation 4, and Equation 5:

$$\rho_{xy} = \text{sgn}(x)(\rho x - y)/\sqrt{x^2 - 2\rho xy + y^2} \quad \text{[Equation 3]}$$

$$\rho_{yx} = \text{sgn}(y)(\rho y - x)/\sqrt{x^2 - 2\rho xy + y^2} \quad \text{[Equation 4]}$$

$$\delta_{xy} = \begin{cases} 0; & xy > 0 \text{ or } xy = 0 \text{ and } x + y \geq 0 \\ 1/2; & \text{AND ELSE} \end{cases} \quad \text{[Equation 5]}$$

Here, function sgn( ) of Equation 3 and Equation 4 corresponds to a sign function having a value of "1" when a value of ( ) is greater than or equal 0, and having a value of "−1" when a value of ( ) is less than 0.

Also, the bivariate Gaussian Q function may have a relationship as given by the following Equation 6:

$$Q(-x,0;\rho) = \tfrac{1}{2} - Q(x,0;-\rho)$$

$$Q(x,0;\rho) = Q(x) - Q(x,0;-\rho). \quad \text{[Equation 6]}$$

Here, the bivariate Gaussian function Q(x, 0; ρ) of Equation 6 may be calculated according to the following Equation 7:

$$Q(x,0;\rho) = \int_x^\infty \frac{\exp(-t^2/2)}{\sqrt{2\pi}} Q\left(-\frac{\rho t}{\sqrt{1-\rho^2}}\right) dt; \quad \text{[Equation 7]}$$

$$x \geq 0, \rho < 0$$

When Equation 7 is substituted based on a univariate Gaussian Q function, it is possible to obtain an equation of calculating the bivariate Gaussian Q function using the univariate Gaussian Q function as given by the following Equation 8:

$$Q(x,0;\rho) \approx \quad \text{[Equation 8]}$$

$$-\frac{\sqrt{1-\rho^2}}{2\rho} \sum_{i=1}^N \frac{a_i}{\sqrt{\beta_i}} Q\left(-\frac{\rho\sqrt{\beta_i}}{\sqrt{1-\rho^2}} x\right);$$

$$x \geq 0, \rho < 0$$

Here, a variable $\beta_i$ of Equation 8 may satisfy the following Equation 9:

$$\beta_i = \frac{1}{\sin^2\theta_i} + \frac{1-\rho^2}{\rho^2}; \quad \text{[Equation 9]}$$

$$0 \leq \theta_i = i\pi/(2N) \leq \pi/2,$$

$$i = 1, \ldots, N$$

Specifically, a univariate Gaussian function Q(u) may be calculated using an error function erfc(u) as given by the following Equation 10:

$$Q(u) = \frac{1}{2}\text{erfc}(u/\sqrt{2}) \quad \text{[Equation 10]}$$

The error function erfc (u) of Equation 10 may be substituted with an equation of calculating an approximate value using an exponential function exp( ) as given by the following Equation 11:

$$\text{erfc}(u) \approx \sum_{i=1}^N a_i \exp(-b_i u^2); \quad \text{[Equation 11]}$$

$$N \to \infty$$

Variables ai and bi of Equation 11 may satisfy the following Equation 12:

$$a_i = \frac{2(\theta_i - \theta_{i-1})}{\pi}, \quad \text{[Equation 12]}$$

$$b_i = \frac{1}{\sin^2\theta_i}$$

$$0 \leq \theta_i = i\pi/(2N) \leq \pi/2,$$

$$i = 1, \ldots, N.$$

FIG. 1 is a block diagram illustrating a communication system using a Gaussian Q function according to an embodiment of the present invention.

Referring to FIG. 1, the communication system using the Gaussian Q function may include an encoder 110, a transceiver 120, a decoder 130, and a bivariate Gaussian Q function analyzer 140.

The encoder 110 may encode information desired to be transmitted by a user using the communication system.

The transceiver 120 may transmit the encoded communication system to another communication system, or may receive encoded communication system from the other communication system.

The encoder 130 may restore information desired to be transmitted by another user by decoding the received communication system.

The bivariate Gaussian Q function analyzer 140 may calculate an error probability by analyzing the restored information using a bivariate Gaussian Q function. Here, the error probability indicates a probability that the restored information is different from the information desired to be transmitted by the other user.

Figure 2:
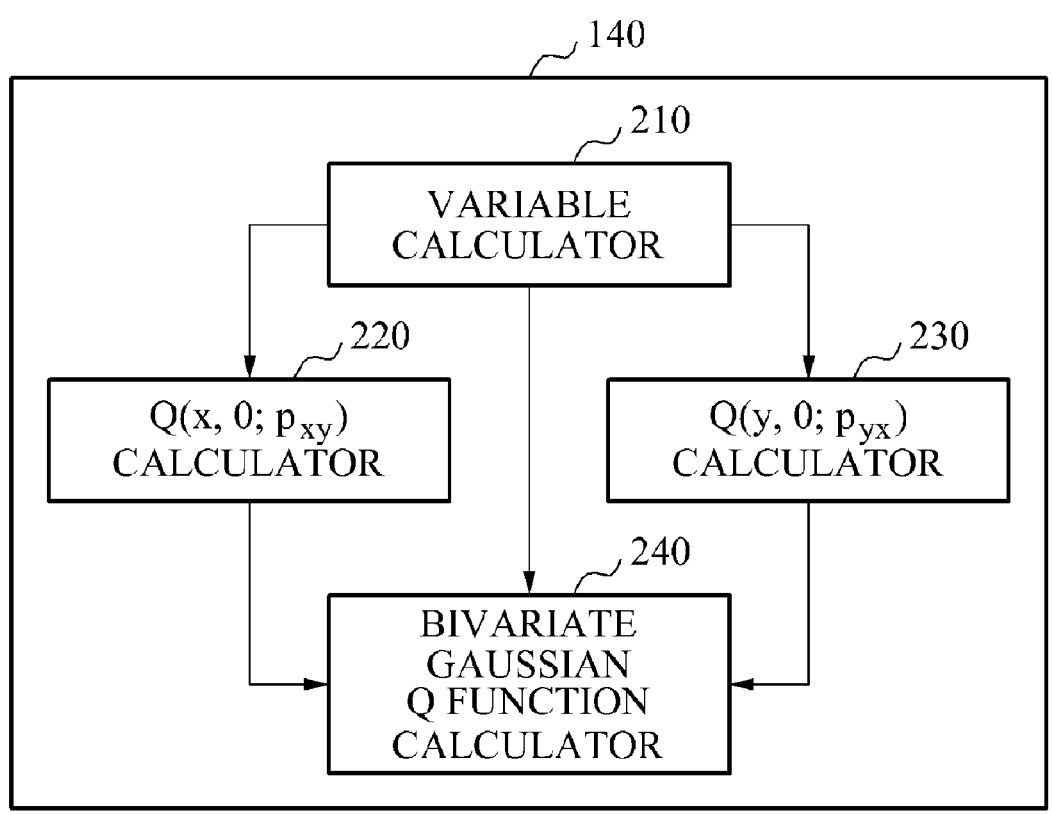
FIG. 2 is a block diagram illustrating an example of a bivariate Gaussian Q function calculator of FIG. 1.

As shown in FIG. 2, the bivariate Gaussian Q function analyzer 140 may include a variable calculator 210, a Q(x, 0; $\rho_{xy}$) calculator 220, a Q(y, 0; $\rho_{yx}$) calculator 230, and a bivariate Gaussian Q function calculator 240.

The variable calculator 210 may receive, from the decoder 130 of FIG. 1, values of x, y, and ρ that are variables of the bivariate Gaussian Q function, and may calculate values of $\rho_{xy}$, $\rho_{yx}$, and $\delta_{xy}$ that are variables of a bivariate Gaussian Q function, based on the values of x, y, and ρ. Here, the values of x, y, and ρ may correspond to parameter values of the restored information or communication information predetermined based on the communication system.

The variable calculator 210 may calculate the values of $\rho_{xy}$, $\rho_{yx}$, and $\delta_{xy}$ that are variables of a bivariate Gaussian Q function by applying the received values of x, y, and ρ to Equation 3, Equation 4, and Equation 5, respectively.

The Q(x, 0; $\rho_{xy}$) calculator 220 may calculate a bivariate Gaussian function Q(x, 0; $\rho_{xy}$) using the univariate Gaussian Q function based on the values of x and $\rho_{xy}$ calculated by the variable calculator 210.

When x is greater than or equal to 0 and $\rho_{xy}$ calculated by the variable calculator 210 is less than 0, the Q(x, 0; $\rho_{xy}$) calculator 220 may calculate the bivariate Gaussian function Q(x, 0; $\rho_{xy}$) using the univariate Gaussian Q function according to Equation 8.

When x is greater than or equal to 0 and $\rho_{xy}$ calculated by the variable calculator 210 is greater than or equal to 0, the Q(x, 0; $\rho_{xy}$) calculator 220 may calculate the bivariate Gaussian function Q(x, 0; $\rho_{xy}$) and the bivariate Gaussian function Q(-x, 0; $\rho_{xy}$) according to Equation 6.

The Q(y, 0; $\rho_{yx}$) calculator 230 may calculate a bivariate Gaussian function Q(y, 0; $\rho_{yx}$) using the univariate Gaussian Q function based on the values of y and $\rho_{yx}$ calculated by the variable calculator 210.

Specifically, when y is greater than or equal to 0, and $\rho_{yx}$ is less than 0, the Q(y, 0; $\rho_{yx}$) calculator 230 may calculate the bivariate Gaussian function Q(y, 0; $\rho_{yx}$) using the univariate Gaussian Q function according to Equation 8.

When y is greater than or equal to 0, and $\rho_{yx}$ is greater than or equal to 0, the Q(y, 0; $\rho_{yx}$) calculator 230 may calculate the bivariate Gaussian function Q(y, 0; $\rho_{yx}$) and the bivariate Gaussian function Q(-y, 0; $\rho_{yx}$) according to Equation 6.

The bivariate Gaussian Q function calculator 240 may calculate the bivariate Gaussian Q function using Q(x, 0; $\rho_{xy}$) calculated by the Q(x, 0; $\rho_{xy}$) calculator 220, Q(y, 0; $\rho_{yx}$) calculated by the Q(y, 0; $\rho_{yx}$) calculator 230, and $\delta_{xy}$ calculated by the variable calculator 210.

Specifically, the bivariate Gaussian Q function calculator 240 may calculate, as the value of the bivariate Gaussian Q function, a value obtained by applying, to Equation 2, Q(x, 0; $\rho_{xy}$), Q(y, 0; $\rho_{yx}$), and $\delta_{xy}$, and by decreasing, by the value of $\delta_{xy}$, a sum of Q(x, 0; $\rho_{xy}$) and Q(y, 0; $\rho_{yx}$).

Figure 3:
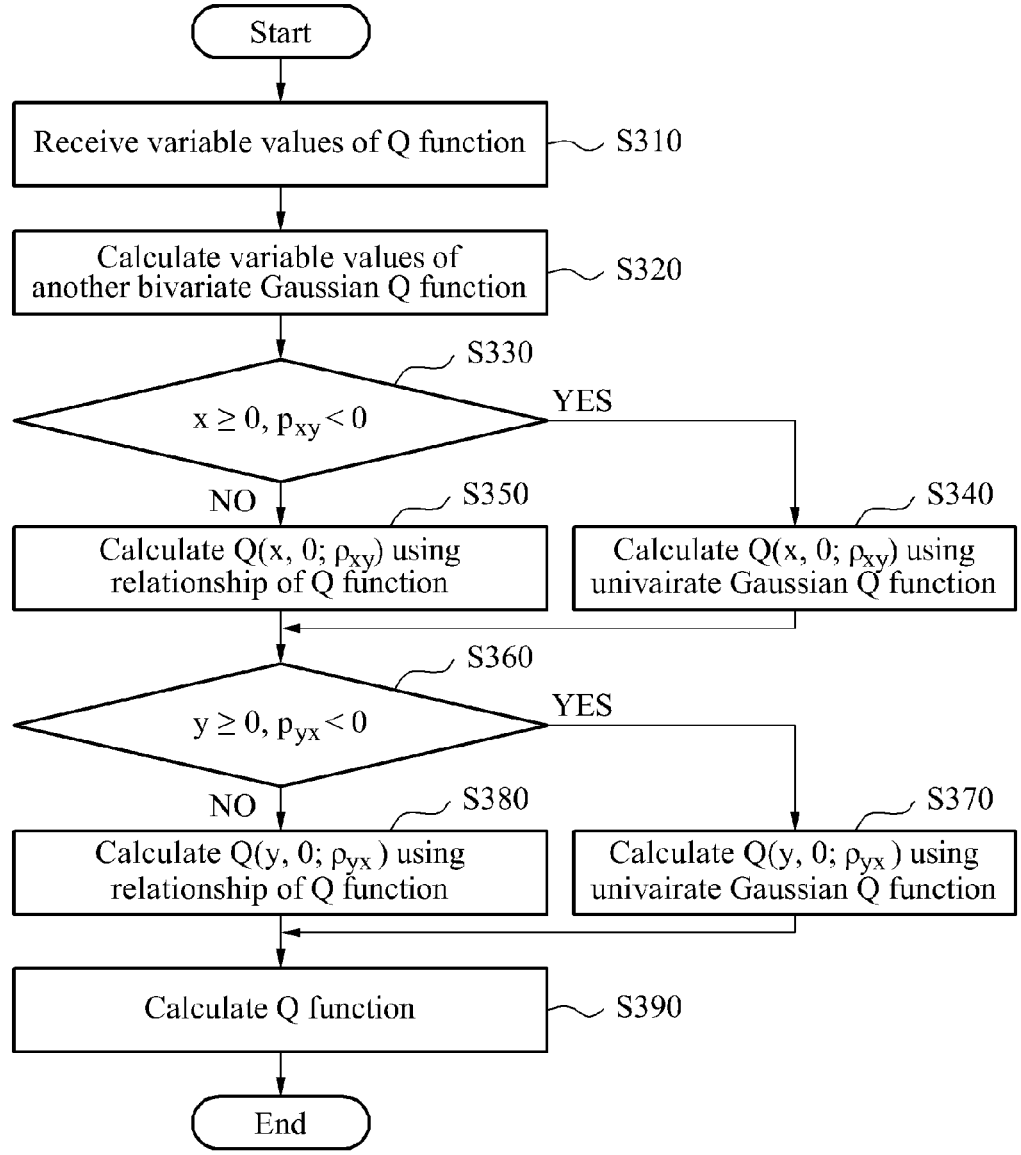
FIG. 3 is a flowchart illustrating a method of calculating a bivariate Gaussian Q function according to an embodiment of the present invention.

FIG. 3 is a flowchart illustrating a method of calculating a bivariate Gaussian Q function according to an embodiment of the present invention.

In operation S310, the variable calculator 210 may receive values of x, y, and ρ that are variables of a bivariate Gaussian Q function.

In operation S320, the variable calculator 210 may calculate values of $\rho_{xy}$, $\rho_{yx}$, and $\delta_{xy}$ that are variables of a bivariate Gaussian Q function, based on the values of x, y, and ρ.

Specifically, the variable calculator 210 may calculate $\rho_{xy}$, $\rho_{yx}$, and $\delta_{xy}$ that are the variables of a bivariate Gaussian Q function by applying the received values of x, y, and ρ to Equation 3, Equation 4, and Equation 5, respectively.

In operation S330, the Q(x, 0; $\rho_{xy}$) calculator 220 may verify whether x is greater than or equal to 0 and $\rho_{xy}$ is less than 0.

In operation S340, when x is greater than or equal to 0 and $\rho_{xy}$ is less than 0, the Q(x, 0; $\rho_{xy}$) calculator 220 may calculate the bivariate Gaussian function Q(x, 0; $\rho_{xy}$) using the univariate Gaussian Q function according to Equation 8.

In operation S350, when x is greater than or equal to 0 and $\rho_{xy}$ calculated by the variable calculator 210 is greater than or equal to 0, the Q(x, 0; $\rho_{xy}$) calculator 220 may calculate the bivariate Gaussian function Q(x, 0; $\rho_{xy}$) and the bivariate Gaussian function Q(-x, 0; $\rho_{xy}$) according to Equation 6.

In operation S360, the Q(y, 0; $\rho_{yx}$) calculator 230 may verify whether y is greater than or equal to 0 and $\rho_{yx}$ is less than 0.

In operation S370, when y is greater than or equal to 0, and $\rho_{yx}$ is less than 0, the Q(y, 0; $\rho_{yx}$) calculator 230 may calculate the bivariate Gaussian function Q(y, 0; $\rho_{yx}$) using the univariate Gaussian Q function according to Equation 8.

In operation S380, when y is greater than or equal to 0, and $\rho_{yx}$ is greater than or equal to 0, the Q(y, 0; $\rho_{yx}$) calculator 230 may calculate the bivariate Gaussian function Q(y, 0; $\rho_{yx}$) and the bivariate Gaussian function Q(-y, 0; $\rho_{yx}$) according to Equation 6.

In operation S390, the bivariate Gaussian Q function calculator 240 may calculate the bivariate Gaussian Q function using Q(x, 0; $\rho_{xy}$) calculated in operation S340 or S350, Q(y, 0; $\rho_{yx}$) calculated in operation S370 or S380, and $\delta_{xy}$ calculated in operation S320.

Specifically, the bivariate Gaussian Q function calculator 240 may calculate, as the value of the bivariate Gaussian Q function, a value obtained by applying, to Equation 2, Q(x, 0; $\rho_{xy}$), Q(y, 0; $\rho_{yx}$), and $\delta_{xy}$, and by decreasing, by the value of $\delta_{xy}$, a sum of Q(x, 0; $\rho_{xy}$) and Q(y, 0; $\rho_{yx}$).

When a method of calculating a bivariate Gaussian Q function according to an embodiment of the present invention is applied to a conventional M-ary Phase Shift Keying (MPSK) symbol error probability equation P(E), P(E) may be modified as given by the following Equation 13:

$$P(E)=1-Q[-\sqrt{2\gamma}\sin(\pi/M), -\sqrt{2\gamma}\sin(\pi/M); -\cos(2\pi/M)] \quad \text{[Equation 13]}$$

Here, γ denotes a signal-to-noise ratio (SNR) per symbol and M denotes a magnitude of a symbol.

According to embodiments of the present invention, a bivariate Gaussian Q function calculation system may calculate a bivariate Gaussian Q function using a univariate Gaussian Q function that is a built-in function. Specifically, since the bivariate Gaussian Q function calculation system can calculate the bivariate Gaussian Q function without using a numerical integral, it is possible to calculate an error probability of a communication system using a mobile calculator or a low efficient calculator of providing only simple calculations.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of calculating an error probability of a communication system, comprising:
   receiving encoded communication information from another communication system;
   restoring information desired to be transmitted by another user by decoding the encoded communication information; and
   calculating the error probability by analyzing the restored information using a bivariate Gaussian Q function, the error probability indicating a probability that the restored information is different from the information desired to be transmitted by the other user,
   wherein the calculating comprises calculating the bivariate Gaussian Q function using a univariate Gaussian Q function.

2. The method of claim 1, wherein the calculating comprises:
   receiving values of x, y, and $\rho$ that are variables of the bivariate Gaussian Q function in the restored information;
   calculating values of $\rho_{xy}$, $\rho_{yx}$, and $\delta_{xy}$ that are variables of a bivariate Gaussian Q function;
   calculating the values of $\rho_{xy}$, $\rho_{yx}$, and $\delta_{xy}$ based on the values of x, y, and $\rho$;
   calculating a bivariate Gaussian function Q(x, 0; $\rho_{xy}$) using the univariate Gaussian Q function based on the values of x and $\rho_{xy}$;
   calculating a bivariate Gaussian function Q(y, 0; $\rho_{yx}$) using the univariate Gaussian Q function based on the values of y and $\rho_{yx}$; and
   calculating the bivariate Gaussian Q function using Q(x, 0; $\rho_{xy}$), Q(y, 0; $\rho_{yx}$), and $\delta_{xy}$.

3. The method of claim 2, wherein the calculating of Q(x, 0; $\rho_{xy}$) comprises:
   verifying whether x is greater than or equal to 0, and $\rho_{xy}$ is less than 0;
   calculating the bivariate Gaussian function Q(x, 0; $\rho_{xy}$) using the univariate Gaussian Q function when x is greater than or equal to 0, and $\rho_{xy}$ is less than 0; and
   calculating the bivariate Gaussian function Q(x, 0; $\rho_{xy}$) using the bivariate Gaussian Q function when x is greater than or equal to 0, and $\rho_{xy}$ is greater than or equal to 0.

4. The method of claim 3, wherein:
   the calculating of the bivariate Gaussian function Q(x, 0; $\rho_{xy}$) using the univariate Gaussian Q function comprises calculating the bivariate Gaussian function Q(x, 0; $\rho_{xy}$) using the univariate Gaussian Q function by employing $$Q(x, 0; \rho) \approx -\frac{\sqrt{1-\rho^2}}{2\rho} \sum_{i=1}^{N} \frac{a_i}{\sqrt{\beta_i}} Q\left(-\frac{\rho\sqrt{\beta_i}}{\sqrt{1-\rho^2}} x\right);$$

$$x \geq 0, \rho < 0,$$

and variables $\alpha_i$, $\beta_i$, and $\theta_i$ are calculated by $$\alpha_i = 2(\theta_i - \theta_{i-1})/\pi;$$

$$\beta_i = \frac{1}{\sin^2\theta_i} + \frac{1-\rho^2}{\rho^2};$$

$$0 \leq \theta_i = i\pi/(2N) \leq \pi/2,$$

$$i = 1, \ldots, N,$$

N being a natural number.

5. The method of claim 2, wherein the calculating of Q(y, 0; $\rho_{yx}$) comprises:
   verifying whether y is greater than or equal to 0, and $\rho_{yx}$ is less than 0;
   calculating the bivariate Gaussian function Q(y,0; $\rho_{yx}$) using the univariate Gaussian Q function when y is greater than or equal to 0, and $\rho_{yx}$ is less than 0; and
   calculating the bivariate Gaussian function Q(y, 0; $\rho_{yx}$) using the bivariate Gaussian Q function when y is greater than or equal to 0, and $\rho_{yx}$ is greater than or equal to 0.

6. The method of claim 5, wherein:
   the calculating of the bivariate Gaussian function Q(y, 0; $\rho_{yx}$) using the univariate Gaussian Q function comprises calculating the bivariate Gaussian function Q(y, 0; $\rho_{yx}$) using the univariate Gaussian Q function by employing $$Q(x, 0; \rho) \approx -\frac{\sqrt{1-\rho^2}}{2\rho} \sum_{i=1}^{N} \frac{a_i}{\sqrt{\beta_i}} Q\left(-\frac{\rho\sqrt{\beta_i}}{\sqrt{1-\rho^2}} x\right);$$

$$x \geq 0, \rho < 0,$$

and variables $\alpha_i$, $\beta_i$ and $\theta_i$ are calculated by $$\alpha_i = 2(\theta_i - \theta_{i-1})/\pi;$$

$$\beta_i = \frac{1}{\sin^2\theta_i} + \frac{1-\rho^2}{\rho^2};$$

$$0 \leq \theta_i = i\pi/(2N) \leq \pi/2,$$

$$i = 1, \ldots, N,$$

N being a natural number.

7. The method of claim 2, wherein the calculating of the bivariate Gaussian Q function comprises calculating a value of the bivariate Gaussian Q function by decreasing a sum of Q(x, 0; $\rho_{xy}$) and Q(y, 0; $\rho_{yx}$) by the value of $\delta_{xy}$.

8. A system for calculating an error probability of a communication system, comprising:
   a receiver to receive encoded communication information from another communication system;
   a decoder to restore information desired to be transmitted by another user by decoding the encoded communication information; and
   a bivariate Gaussian Q function analyzer to calculate the error probability by analyzing the restored information using a bivariate Gaussian Q function, the error probability indicating a probability that the restored information is different from the information desired to be transmitted by the other user,
   wherein the bivariate Gaussian Q function analyzer calculates the bivariate Gaussian Q function using a univariate Gaussian Q function.

9. The system of claim 8, wherein the bivariate Gaussian Q function analyzer comprises:
   a variable calculator to receive values of x, y, and $\rho$ that are variables of the bivariate Gaussian Q function, and to calculate values of $\rho_{xy}$, $\rho_{yx}$, and $\delta_{xy}$ that are variables of a bivariate Gaussian Q function, based on the values of x, y, and $\rho$;

a Q(x, 0; $\rho_{xy}$) calculator to calculate a bivariate Gaussian function Q(x, 0; $\rho_{xy}$) using the univariate Gaussian Q function based on the values of x and $\rho_{xy}$;

a Q(y, 0; $\rho_{yx}$) calculator to calculate a bivariate Gaussian function Q(y, 0; $\rho_{yx}$) using the univariate Gaussian Q function based on the values of y and $\rho_{yx}$; and a bivariate Gaussian Q function calculator to calculate the bivariate Gaussian Q function using Q(x, 0; $\rho_{xy}$), Q(y, 0; $\rho_{yx}$), and $\delta_{xy}$.

10. The system of claim 9, wherein the Q(x, 0; $\rho_{xy}$) calculator calculates the bivariate Gaussian function Q(x, 0; 92 $_{xy}$) using the univariate Gaussian Q function when x is greater than or equal to 0, and $\rho_{xy}$ is less than 0, and calculates the bivariate Gaussian function Q(x, 0; $\rho_{xy}$) using the bivariate Gaussian Q function when x is greater than or equal to 0, and $\rho_{xy}$ is greater than or equal to 0.

11. The system of claim 10, wherein:

the Q(x, 0; $\rho_{xy}$) calculator calculates the bivariate Gaussian function Q(x, 0; $\rho_{xy}$) using the univariate Gaussian Q function by employing $$Q(x, 0; \rho) \approx -\frac{\sqrt{1-\rho^2}}{2\rho} \sum_{i=1}^{N} \frac{a_i}{\sqrt{\beta_i}} Q\left(-\frac{\rho\sqrt{\beta_i}}{\sqrt{1-\rho^2}}x\right);$$

$$x \geq 0, \rho < 0,$$

and variables $\alpha_i$, $\beta_i$ and $\theta_i$ are calculated by $$\alpha_i = 2(\theta_i - \theta_{i-1})/\pi;$$

$$\beta_i = \frac{1}{\sin^2\theta_i} + \frac{1-\rho^2}{\rho^2};$$

$$0 \leq \theta_i = i\pi/(2N) \leq \pi/2,$$

$$i = 1, \ldots, N,$$

N being a natural number.

12. The system of claim 9, wherein the Q(y, 0; $\rho_{yx}$) calculator calculates the bivariate Gaussian function Q(y, 0; $\rho_{yx}$) using the univariate Gaussian Q function when y is greater than or equal to 0, and $\rho_{yx}$ is less than 0, and calculates the bivariate Gaussian function Q(y, 0; $\rho_{yx}$) using the bivariate Gaussian Q function when y is greater than or equal to 0, and $\rho_{yx}$ is greater than or equal to 0.

13. The system of claim 12, wherein:

the Q(y, 0; $\rho_{yx}$) calculator calculates the bivariate Gaussian function Q(y, 0; $\rho_{yx}$) using the univariate Gaussian Q function by employing $$Q(x, 0; \rho) \approx -\frac{\sqrt{1-\rho^2}}{2\rho} \sum_{i=1}^{N} \frac{a_i}{\sqrt{\beta_i}} Q\left(-\frac{\rho\sqrt{\beta_i}}{\sqrt{1-\rho^2}}x\right);$$

$$x \geq 0, \rho < 0,$$

and variables $\alpha_i$, $\beta_i$ and $\theta_i$ are calculated by $$\alpha_i = 2(\theta_i - \theta_{i-1})/\pi;$$

$$\beta_i = \frac{1}{\sin^2\theta_i} + \frac{1-\rho^2}{\rho^2};$$

$$0 \leq \theta_i = i\pi/(2N) \leq \pi/2,$$

$$i = 1, \ldots, N,$$

N being a natural number.

14. The system of claim 9, wherein the bivariate Gaussian Q function calculator calculates a value of the bivariate Gaussian Q function by decreasing a sum of Q(x, 0; $\rho_{xy}$) and Q(y, 0; $\rho_{yx}$) by the value of $\delta_{xy}$.

15. The system of claim 9, wherein the values of x, y, and $\rho$ that are the variables of the bivariate Gaussian Q function correspond to parameter values of the restored information or communication information predetermined based on the communication system.

16. A method of calculating a bivariate Gaussian Q function for analyzing an error probability of a communication system, the method comprising:

receiving values of x, y, and $\rho$ from the communication system, x, y, and $\rho$ being parameters of the communication system and being used as variables of the bivariate Gaussian Q function;

calculating values of $\rho_{xy}$, $\rho_{yx}$, and $\delta_{xy}$ that are variables of a bivariate Gaussian Q function;

calculating the values of $\rho_{xy}$, $\rho_{yx}$, and $\delta_{xy}$ based on the values of x, y, and $\rho$;

calculating a bivariate Gaussian function Q(x, 0; $\rho_{xy}$) using a univariate Gaussian Q function based on the values of x and $\rho_{xy}$;

calculating a bivariate Gaussian function Q(y, 0; $\rho_{yx}$) using the univariate Gaussian Q function based on the values of y and $\rho_{yx}$;

calculating the bivariate Gaussian Q function using Q(x, 0; $\rho_{xy}$), Q(y, 0; $\rho_{yx}$), and $\delta_{xy}$, and calculating the error probability for the communication system using the calculated bivariate Gaussian Q function.

17. The method of claim 16, wherein the calculating of Q(x, 0; $\rho_{xy}$) comprises:

verifying whether x is greater than or equal to 0, and $p_{xy}$ is less than 0;

calculating the bivariate Gaussian function Q(x, 0; $\rho_{xy}$) using the univariate Gaussian Q function when x is greater than or equal to 0, and $\rho_{xy}$ is less than 0; and calculating the bivariate Gaussian function Q(x, 0; $\rho_{xy}$) using the bivariate Gaussian Q function when x is greater than or equal to 0, and $\rho_{xy}$ is greater than or equal to 0.

18. The method of claim 16, wherein the calculating of Q(y, 0; $\rho_{yx}$) comprises:

verifying whether y is greater than or equal to 0, and $\rho_{yx}$ is less than 0;

calculating the bivariate Gaussian function Q(y, 0; $\rho_{yx}$) using the univariate Gaussian Q function when y is greater than or equal to 0, and $\rho_{yx}$ is less than 0; and calculating the bivariate Gaussian function Q(y, 0; 92 $_{yx}$) using the bivariate Gaussian Q function when y is greater than or equal to 0, and $\rho_{yx}$ is greater than or equal to 0.

19. A system for calculating a bivariate Gaussian Q function, the system comprising:
a variable calculator to receive values of x, y, and ρ that are variables of the bivariate Gaussian Q function, and to calculate values of $\rho_{xy}$, $\rho_{yx}$, and $\delta_{xy}$ that are variables of a bivariate Gaussian Q function, based on the values of x, y, and ρ;
a $Q(x, 0; \rho_{xy})$ calculator to calculate a bivariate Gaussian function $Q(x, 0; \rho_{xy})$ using a univariate Gaussian Q function based on the values of x and $\rho_{xy}$;
a $Q(y, 0; \rho_{yx})$ calculator to calculate a bivariate Gaussian function $Q(y, 0; \rho_{yx})$ using the univariate Gaussian Q function based on the values of y and $\rho_{yx}$; and
a bivariate Gaussian Q function calculator to calculate the bivariate Gaussian Q function using $Q(x, 0; \rho_{xy})$, $Q(y, 0; \rho_{yx})$, and $\delta_{xy}$.

* * * * *